United States Patent
de Corlieu et al.

[11] 4,045,120
[45] Aug. 30, 1977

[54] COUPLER FOR OPTICAL COMMUNICATION SYSTEM

[75] Inventors: Guy de Corlieu; Jean-Claude Reymond, both of Paris, France

[73] Assignee: Thomson-CSF, Paris, France

[21] Appl. No.: 642,446

[22] Filed: Dec. 19, 1975

[30] Foreign Application Priority Data

Dec. 20, 1974 France .................. 74.42370

[51] Int. Cl.² .................. G02B 5/16
[52] U.S. Cl. .................. 350/96 C; 250/551; 350/96 WG
[58] Field of Search .......... 350/96 WG, 96 C, 96 B; 250/227, 551

[56] References Cited

U.S. PATENT DOCUMENTS

| | | | |
|---|---|---|---|
| 3,756,688 | 9/1973 | Hudson et al. | 350/96 WG |
| 3,832,028 | 8/1974 | Kapron | 350/96 WG |
| 3,950,075 | 4/1976 | Cook et al. | 350/96 C |

*Primary Examiner*—John K. Corbin
*Assistant Examiner*—Rolf Hille
*Attorney, Agent, or Firm*—Cushman, Darby & Cushman

[57] ABSTRACT

A coupler for coupling the end of an optical signal transmission line comprising at least one optical waveguide, to a solidstate converter device such as a light emitting diode or a photosensitive diode according to the case, the converter device presenting a refractive index N3 higher than the refractive index N1 of the optical waveguide. The coupler comprises a transparent matching medium having at least a refractive index N4 of value intermediate between the values N1 and N3 and forming a thin parallel faced plate whose maximum thickness is determined on the basis of the numerical aperture of the guide.

10 Claims, 6 Drawing Figures

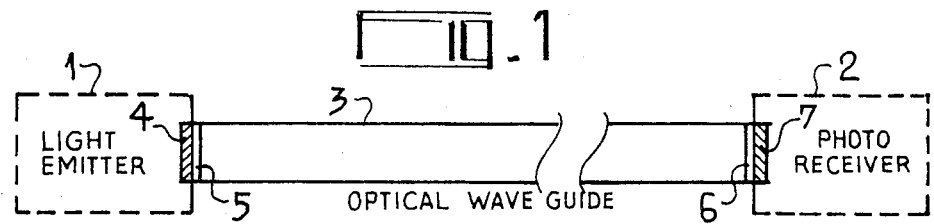
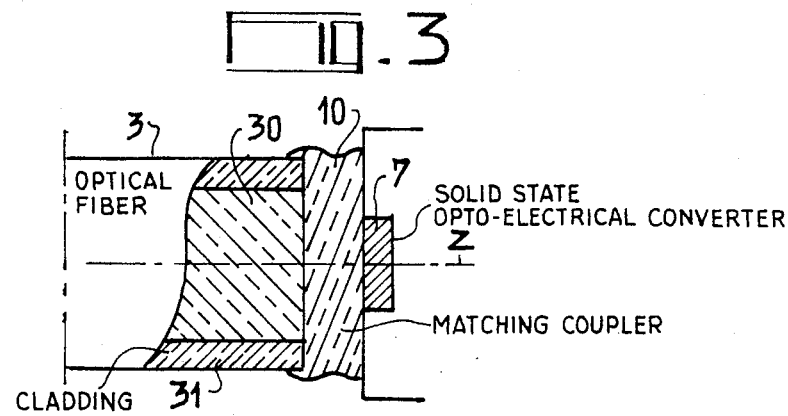
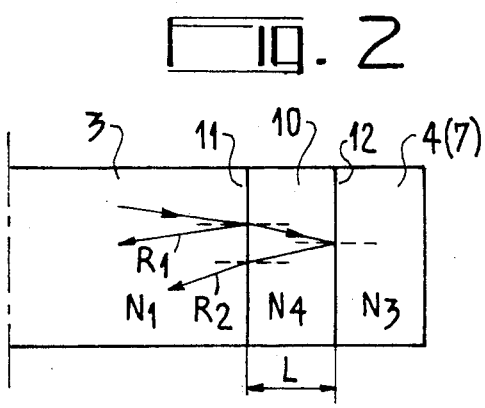
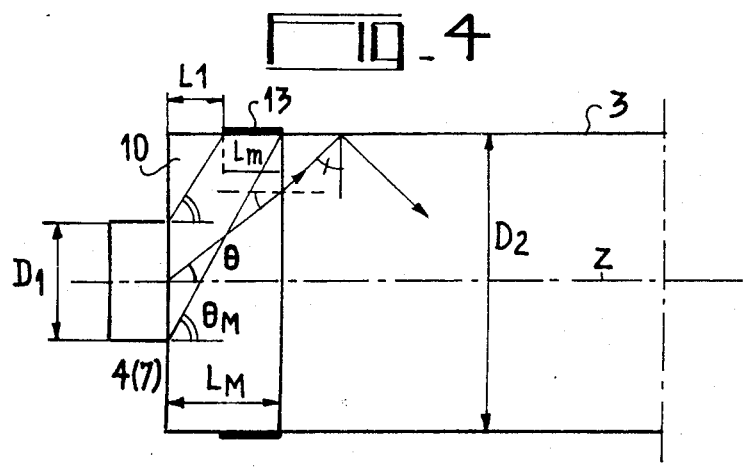

COUPLER FOR OPTICAL COMMUNICATION SYSTEM

The present invention relates to a coupler for optical communication system.

BACKGROUND OF THE INVENTION

Connections utilizing transmission lines formed by light guides are finding increasingly wide-spread use, particularly in the field of data-transmission. Besides remote communication by means of optical waveguides, such connections may also be used to provide interconnection between points which are normally connected by electrical connections.

An optical signal transmission line of the type in question generally consists of at least one optical waveguide with conversion means at either end. At one end of the optical waveguide, conversion means convert a signal to be transmitted, which is generally an electrical signal, into light energy and constitute emitting means. At the other end of the optical waveguide, conversion means convert the transmitted light energy back into a suitable signal, generally likewise in electric form, and constitute reception means. The optical waveguide is formed by at least one optical fiber and usually by a plurality of fibers which are combined into a fiber bundle.

An optical fiber is formed normally by a coaxial structure with a transparent core having a refractive index N1 surrounded by a layer of transparent cladding material having a refractive index N2 which is lower than N1. The refractive index values for glasses may vary between 1.5 and 1.485 for example. The diameter of the core may vary between a size close to the wavelength of the light when the lightguide to be produced is a monomode guide and approximately 80 μm or more in the case of multimode guides. In preferred embodiments the diameter selected is in the range 25 to 45 μm so as to reconcile transmitted power and pass-band characteristics while propogating only a fairly limited number of modes.

The transmission and reception means may be made small in size by using semiconductor components, such as gallium arsenide diodes for transmission and silicon diodes for reception. These semiconductor materials have normally considerable higher refractive indices than the optical waveguide.

If the refractive index of air is taken as 1, the value for the refractive index of silicon is on the order of 4, of gallium arsenide 3.6, and of the glass of the optical fiber 1.5.

The optical signal transmission line is thus formed with materials having different refractive indices along its optical path, as a result of which a part of the light energy transmitted is reflected and fails to reach the receiver.

The Fresnel formulae relating to normal reflection by transparent isotropic bodies give a value of $[(n-1)/(n+1)]^2$ for the reflection factor R of the boundary surface between two media, $n$ being the relative index of one of the media with respect to the other, the transmittance being $T = 4n/(n+1)^2$.

The reflection factor R becomes smaller the closer $n$ approaches to 1, that is to say, the smaller the disparity between the indices. By way of example, the reflection factor R has the following values with the index values mentioned above and in the cases of the following interfaces:

glass/air interface, $R_{G-A} = 0.04$
air/silicon interface, $R_{A-Si} = 0.36$
air/gallium arsenide interface, $R_{A-GaAs} = 0.30$
glass/silicon interface, $R_{G-Si} = 0.20$
glass/gallium arsenide interface, $R_{G-GaAs} = 0.17$ These last two values apply to embodiments where the glass of the fiber is in bonded contact with the semiconductor with no air interface.

To increase the performance of such optical communication systems, it has proved to be necessary to reduce propagation losses and in particular those due to reflections. Propagation losses in the fiber itself are negligible in the case of short-range connections, those of a few tens to a few hundreds of meters for example, and there are at the moment fibers in which attenuation is less than 2 dB per km and which in commercially available form provide an attenuation of 20 dB/km.

Taking the case of a light energy Eo, which is transmitted without appreciable losses along an optical waveguide and arrives at the exit interface, the major proportion of the energy is transmitted to the receiver and the remaining part E1 is reflected. This part E1 is propagated in the reverse direction to the entry interface where a further fraction E2 is reflected and travels back to the receiver, and so on. The amount of energy E2 which arrives at the receiver for the second time may be quite high. In the case of a short-range link having a gallium arsenide transmitter and a silicon receiver it may be 0.034 Eo, i.e. −32 dB, where the ends of the guide are bonded, and 0.13 Eo, i.e. −17 dB, with air interfaces. Under these conditions it is possible that the receiver will pick up this secondary signal, which represents a strong spurious signal. The result is that large disparities between the refractive indices at the ends are a serious restriction on the technical potentialities of such optical communication systems.

SUMMARY OF THE INVENTION

One object of the invention is to overcome the drawbacks mentioned by providing an optical communication system in which multiple reflections are very greatly reduced and become virtually negligible. Thus, the receiver device at the exit interface is rendered immune to the erroneous or untimely detection of such spurious signals.

In accordance with the invention, there is provided in a optical communication system having at least one signal transmission line comprising at least one optical waveguide having a core of transparent material having a refractive index N1 surrounded by a layer of transparent cladding material having a refractive index N2 that is lower than N1 and associated by each end to a solid state converter device for light emission and light reception respectively, said converter devices having refractive indices higher than the said core index, optical coupling means for coupling at least one of the said waveguide ends to an associated device through an optical coupler comprising at least one transparent matching medium having a refractive index N4 intermediate between the said core index N1 and the refractive index N3 of the associated device and forming a thin plate having a maximum thickness LM given by $$LM = (D1 + D2)/2 \cdot \sqrt{N4 - A^2}/A$$

where A is the numerical aperture i.e. $\sqrt{N1^2 - N2^2}$ and D1, D2 the diameters of the interfaces with the coupling adjacent media formed by the core of the waveguide and the associated device respectively.

BRIEF DESCRIPTION OF THE DRAWINGS

The invention will now be further described with reference to the accompanying drawings, in which:

FIG. 1 is a simplified diagram of an optical waveguide connection between a transmitter and a receiver;

FIG. 2 is a simplified diagram showing a coupler according to the invention arranged at one end of the optical waveguide connection of the FIG. 1;

FIG. 3 is a schematic of an embodiment according to FIG. 2;

FIG. 4 is a simplified diagram relating to the dimensions of the coupler;

DESCRIPTION OF THE PREFERRED EMBODIMENTS

Figure 5:
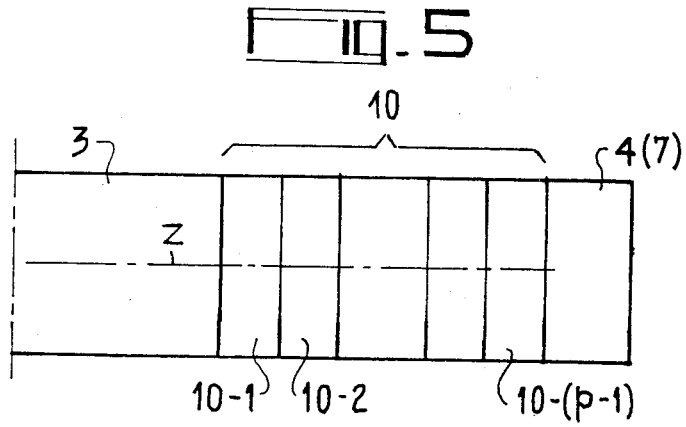
FIG. 5 is a simplified diagram of modified embodiment of the coupler.

The elementary optical signal transmission line shown schematically in FIG. 1 comprises a transmitter 1 connected to a receiver 2 by an optical waveguide 3. The transmitter 1 is of the optical type having solid-state light emitting means such as a gallium arsenide semiconductor component forming a photoemitter diode 4 which convert an electric signal into a light signal. The light signal is radiated by the emitter face of the light emitting diode, which is positioned opposite the corresponding face at the entry end of the optical waveguide 3 and which may be separated therefrom by an air-gap or which may be secured to this inlet face by means or a transparent adhesive 5. The other end, representing the exit face of the optical waveguide, may be similarly bonded by an adhesive 6 to the photo-receptive surface of a semiconductor device 7, such as a photosensitive silicon diode. Layers 5 and 6 may be produced using an epoxy resin or any other transparent adhesive. The optical waveguide is formed by at least one optical fiber which is made of glass or of some other transparent material, such as a plastics transparent material, and which has predetermined refractive indices for core and cladding and good light transmission characteristics. Normally the optical waveguide is formed by a plurality of fibers which make up a bundle and the material is silicon based.

In a known way, the adhesive substance 5 and 6 in the embodiments where the ends are bonded has a refractive index close to that of one of the adjacent media and is generally the same as or less than that of the core. Thus, a bonded end is, in essence, made up of two media which have differing indices as regards optical transmission, namely that N1 which applies to the core and the higher one N3 for the converting medium associated with this end.

An intermediate medium 10 made of a transparent substance is interposed in the optical path between a given end-face of guide 3 and the face of the associated converter member 4 or 7, as shown in the diagram in FIG. 2.

This intermediate medium is intended to match the optical transmission by reducing the amount of light reflected as much as possible and constitutes an optical coupler. It is known from the properties of thin plates than an ideal match representing zero reflection is achieved by inserting between media whose refractive indices are N1 and N3 a quarter-wave plate whose refractive index is $N4 = \sqrt{N1 \cdot N3}$ and whose thickness $e = \lambda/4$, where $\lambda$ is the wavelength of the light signal in the material.

The condition relating to the value of the refractive index can be met whereas that relating to thickness can only be met with difficulty.

In a first embodiment, the thickness L of the medium 10 whose index N4 is equal to $\sqrt{N1 \cdot N3}$ is large in comparison with the wavelength. Under these conditions, the proportion of energy in the first reflection at face 11 is given by $R1 = [(N4 - N1)/(N4 + N1)]^2$ and that of a second reflection, at face 12 after transmission by interface 11, is:

$$R2 = (1 - R1)^2 [(N3 - N4)/(N3 + N4)]^2$$

that is:

$$R2 = \frac{16 N1^2 N4^2}{(N1 + N4)^4} \left( \frac{N3 - N4}{N3 + N4} \right)^2$$

With the value selected for index N4, the overall reflection factor $R = R1 + R2$ is equal to:

$$\left( \frac{N4 - N1}{N4 + N1} \right)^2 \left( 1 + \frac{16 N1^2 N4^2}{(N1 + N4)^4} \right)$$

In the case where N3 = 4 (silicon) and N1 = 1.5 (glass), the factor R is equal to 0.110 instead of $R_{G-Si}$ = 0.20 with no matching. With N3 = 3.6 (gallium arsenide) and N1 = 1.5, R = 0.088 instead of $R_{G-GaAs}$ = 0.17 with no matching. There is thus obtained a considerable improvement in performance as a result of a reduction in the amount of reflection by using such an optical coupler at the end of a light and preferably at both ends.

The coupler 10 is advantageously made small in thickness and may itself form the adhesive substance as a substitute for members 5 and 6 in FIG. 1. This is shown in FIG. 3 as applied to one end, namely the reception end.

For reasons of simplicity the light guide in this view consists of only a single optical fiber formed by a core 30 and a cladding 31.

The thickness of the thin plate thus formed by the intermediate coupling medium 10 is preferably made less than, or at most the same as, a maximum value LM which is determined on the basis of the numerical aperture A of the optical waveguide. Referring to FIG. 4, the maximum value $\theta M$ for the deviation angle $\theta$ of a light ray is known as the acceptance half angle of the waveguide, and is given by the equation: $N4 \sin \theta M = \sqrt{N1^2 - N2^2} = A$, where N2 is the refractive index of the cladding material 31 surrounding the core 30 of index N1. The thickness LM of the coupler 10 is so calculated that the maximum deviation angle of emitted or received radiation, depending on the end concerned, is the acceptance half angle $\theta$ M. Value LM is given by the equation: $LM \tan \theta M = (D1 + D2)/2$ where D1 and D2 are the respective diameters of whichever of the electro-optical converters 4 and 7 is considered and of the core of the optical waveguide. The resultant value is $LM = (D1 + D2)/2 \cdot \sqrt{N4^2 - A^2}/A$. By way of example, where $D1 = 50$ μm, $D2 = 100$ μm, $N1 = 1.5$, $N2 = 1.48$ and $N4 = 2.32$, LM is 708 μm or approximately 0.7 mm. Thus only those light rays which are emitted by member 4 in a meridian cone corresponding to the numerical aperture are transmitted through interface 10 - 3 and are propagated by the guide. conversely, at reception, the rays propagated by guide 3 are received by the photo-receptive surface of member 7.

Optical transmission is improved by applying to the outer face of the coupler 10, which may be looked upon as a continuation of the outer face of the optical guide 3, a reflective deposit 13, such as a deposit of metal. This reflective deposit may be restricted to a minimal length L$m$ from interface 10 - 3 and its length is then LM - L1 along the axis Z of the guide. LM being of the form $(D1 + D2)/2$ K where $K = 1/\tan \theta M$, the value of $L1$ is given by $(D2 - D1)/2$ K and L$m$ = $D1K$.

FIG. 5 shows a modified embodiment in which the refractive index of the coupler presents a plurality of values giving a progressive change of the refractive index between the values N1 and N3 for the adjacent media. Coupler 10 is in fact made up of a plurality of intermediate media which are $(p - 1)$ in number and which are referenced $10 - 1$ to $10 - (p - 1)$ and whose respective refractive indices are N4(1) to N4($p-1$). The value for the index N4(j) of the element $10 - j$ in an intermediate serial position $j$ is made equal to the geometric mean of the indices of adjacent media, i.e.

$$N4(j) = \sqrt{N4(j - 1) \cdot N4(j + 1)}$$

and the change in the indices is a geometric progression in which the ratio $a$ is greater than 1 and is so determined that $N4(j) = a \cdot N4(j-1)$ and $a^p = N3/N1$. The coupler 10 is thus formed by a group of thin plates which is produced so as to give an overall thickness LM and possibly has a reflecting deposit on its periphery as described with reference to FIG. 4.

In another modified embodiment, instead of the previous discontinuous changes, a continuous change from the index values N1 to the value N3 of the adjacent media may be produced. In this case the amount of reflection is zero and the end is theorically perfectly matched. This embodiment is even better than with a quarter-wave plate, given that there is no longer any wavelength scatter and that the inclination of the beam to the axis of propagation is immaterial. A coupler 10 in which the index changes continuously may for example be obtained from the natural materials silicon (Si), silicon monoxide (SiO) and silicon dioxide or silica (SiO$^2$), whose respective indices are of the order of 4, 2 and 1.48. The procedure used for this may be mixing nd heating under reduced pressure and doping with other substances by ion exchange under the influence of a magnetic field.

Figure 6:
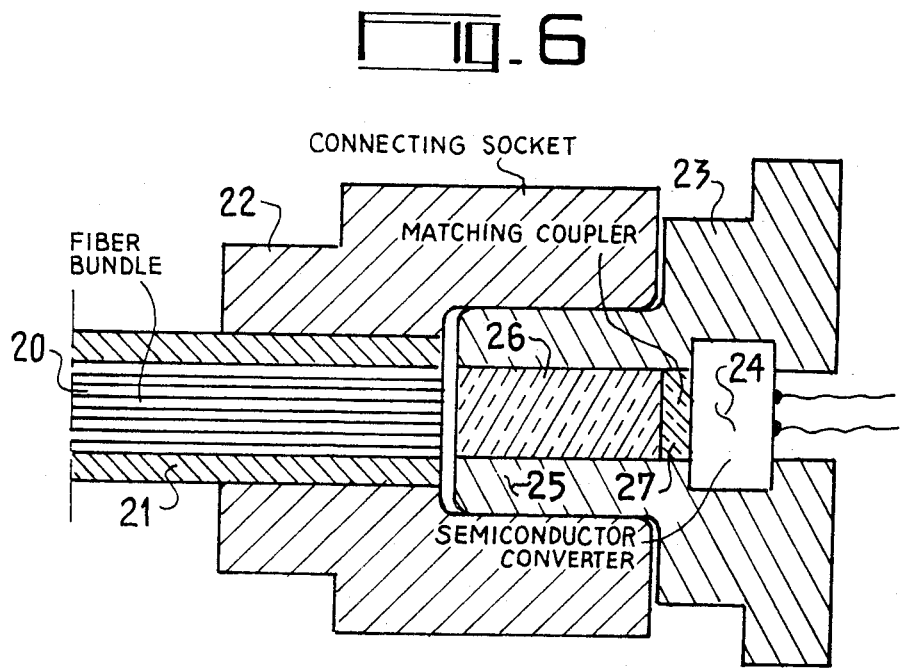
FIG. 6 is a diagram of an embodiment of a connection made to an optical waveguide having an exposed end, using a socket for connecting to a converter device of the solid-state type.

FIG. 6 relates to an embodiment of connection in which the optical waveguides have exposed i.e. unbonded ends, these being required in the case of equipment in which stresses due to vibration prevent bonded ends from being used. In general terms, the optical waveguide consists of a fiber bundle 20 and an external envelope 21 made of a flexible opaque material, such as a plastics material. The ends of the guide are each provided with a connector comprising a connecting socket 22 which co-operates with a support 23 for an opto-electrical semiconductor converter member 24. For this purpose, support 23 has a cylindrical portion 25 which fits into a corresponding recessed portion of socket 22. Cylindrical portion 25 is apertured to allow light rays to pass through and generally contains a cylinder 26 of a transparent material whose refractive index is substantially the same as that of the fiber core. After connection, a thin plate of air is left between the end faces of bundle 20 and the optical fiber element or glass cylinder 26. Since the reflection factor in an air/glass interface is approximately 0.04, losses arising from the thin plate of air are small, being approximately 0.08. By arranging a coupler 27 of one of the types described between the end of cylinder 26 and semiconductor converter 24, the connection is virtually matched while the ends of the optical waveguide are still not bonded.

Of course, the invention is not limited to the embodiments described and shown which were given solely by way of examples.

What is claimed is:

1. In an optical communication system having at least one signal transmission line comprising at least one optical waveguide having a core of transparent material having a refractive index N1 surrounded by a layer of transparent cladding material having a refractive index N2 that is lower than N1 and associated by each end to a solid state converter device for light emission and light reception respectively, said converter devices having refractive indices higher than the said core index, optical coupling means for coupling at least one said waveguide end to a said associated device through an optical coupler comprising at least one transparent matching medium having a refractive index N4 intermediate between the said core index N1 and the refractive index N3 of the associated device and forming a thin plate whose maximum thickness along the optical axis direction is given by the relation $$LM = [(D1 + D2)/2] \cdot [(\sqrt{N4^2 - A^2})/A]$$

where A is the numerical aperture of the waveguide, i.e. $\sqrt{N1^2 - N2^2}$ and D1, D2, the diameters of the plane interfaces perpendicular to said axis direction and provided by the core at said waveguide end and the associated device respectively.

2. A system according to claim 1, wherein the said coupler is surrounded on its periphery by a reflective deposit.

3. A system according to claim 2, wherein the said reflective deposit is applied over at least a length of L$m$ = $D1 \cdot [(\sqrt{N4^2 - A^2})/A]$ from the interface with the core of the waveguide.

4. A system according to claim 1, wherein the said coupler is formed from a material whose refractive index is substantially equal to the geometric mean between the indices of the core and the associated device.

5. A system according to claim 1, wherein the said coupler is formed by a plurality $(p - 1)$ of parallel-faced plates which are juxtaposed in the direction of optical propagation and each of which is formed from a different material from the others, the corresponding refractive indices for these plates and materials being so determined that they produce a predetermined law of variation increasing between the index figures for the core N1 and for the associated device N3.

6. A system according to claim 5, wherein the said $(p - 1)$ plates have values for their refractive indices which give a discontinuous change following a geometric progression in which the ratio $a$ is such that $a^p = N3/N1$.

7. A system according to claim 1, wherein the said coupler is formed by a member which is made of a material whose index alters continuously from the value N1 for the core to that N3 for the associated device.

8. A system according to claim 1, wherein the said coupler forms the adhesive material which is used to join the end of the guide in question to the associated device.

9. A system according to claim 8, wherein the said optical waveguide is in at least two parts, one of which is formed by a element of optical waveguide which is joined to an associated device via the said optical coupler, and the other of which represents the optical waveguide proper and is formed by at least one optical fiber having the said core and cladding, the said parts being connected by connection devices which provide an airgap between their opposing faces.

10. An optical coupler for coupling a transmission line to an electro-optical converter device, said transmission line comprising at least one optical waveguide having a core of transparent material surrounded by a layer of transparent cladding material whose refractive index N2 is lower then that of N1 of the core, said converter device having refractive index N3 higher than the said core index N1, said coupler extending between two parallel plane faces presented by the waveguide end and the converter respectively, said plane faces being centered on the optical axis of said waveguide end, said coupler comprising a matching transparent medium whose refractive index N4 is determined intermediate between said values N1 and N3, said medium forming a thin plate between said faces and having a thickness along said optical axis direction determined such that light rays transmitted in the said medium and extending between said two faces present angular deviations with respect to said optical axis whose maximum value $\Theta M$ is given by $N4 \sin \theta M = A$ where A is the numerical aperture of the waveguide.

* * * * *